Aug. 4, 1964  R. C. PRATT ET AL  3,143,451
METHOD OF MAKING A MULTI-PLY PLASTIC TUBULAR ARTICLE
Filed Oct. 16, 1959  2 Sheets-Sheet 1
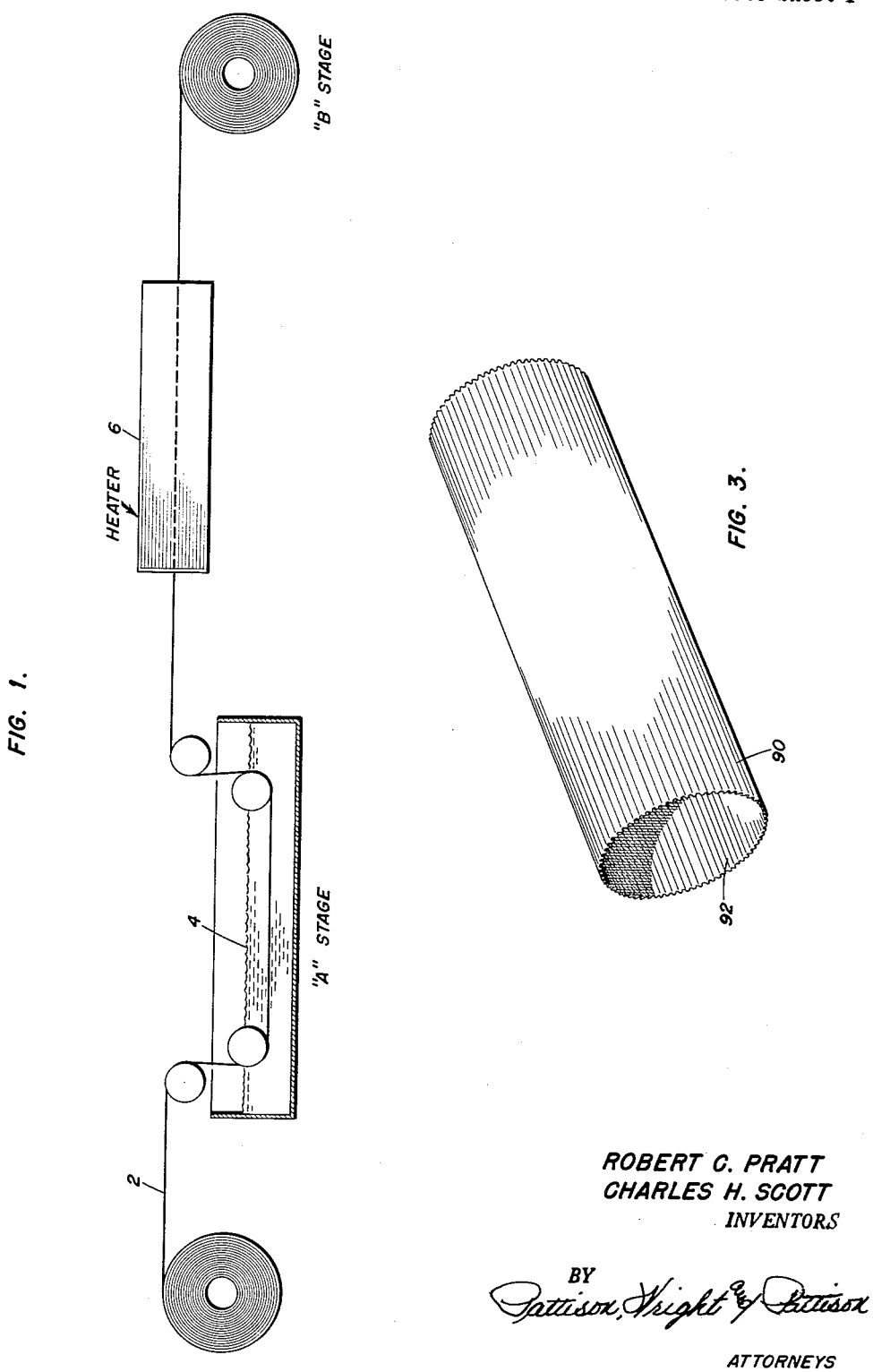
ROBERT C. PRATT
CHARLES H. SCOTT
    INVENTORS
BY
*Pattison, Wright & Pattison*
ATTORNEYS

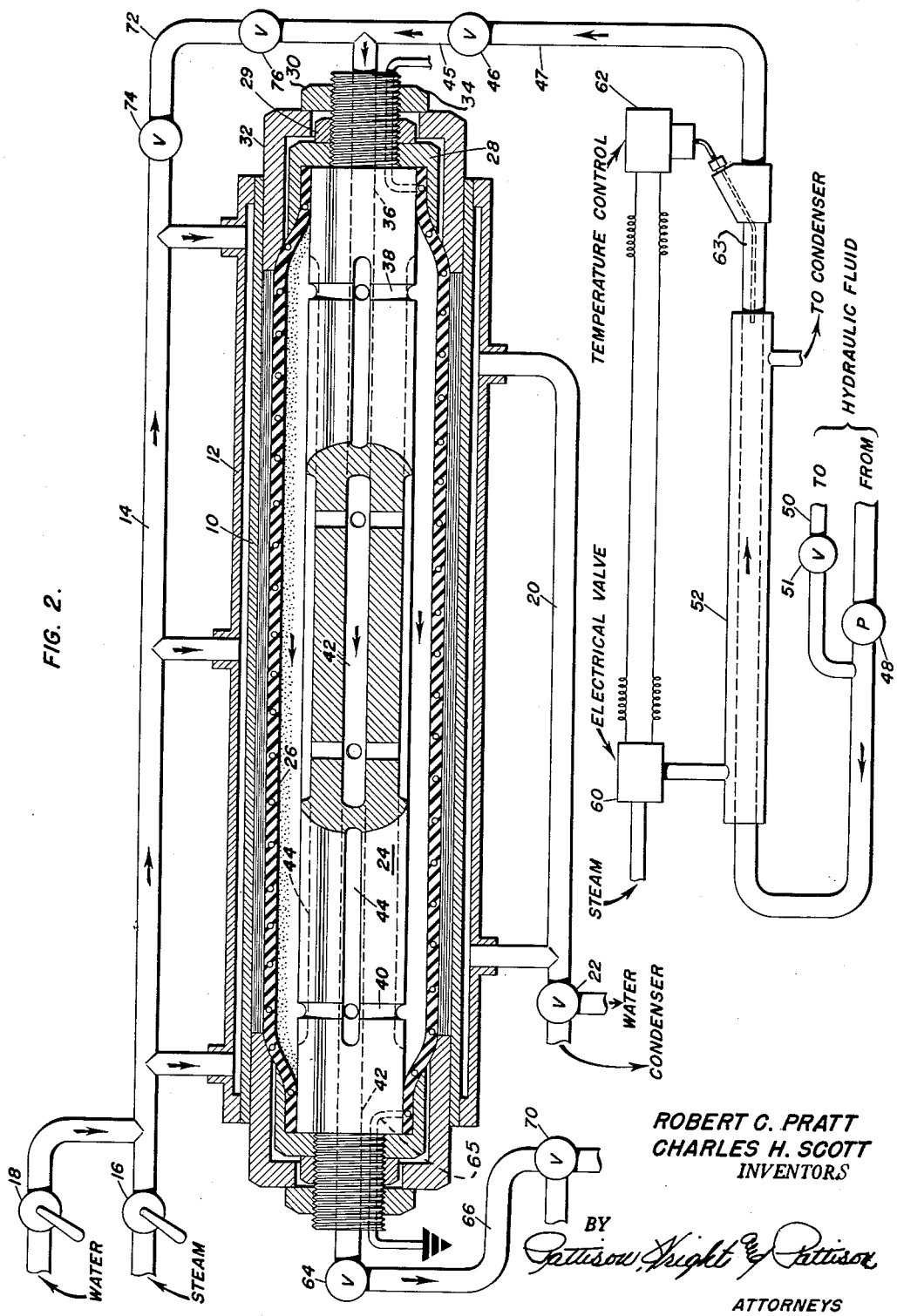

United States Patent Office 3,143,451
Patented Aug. 4, 1964

3,143,451
METHOD OF MAKING A MULTI-PLY PLASTIC TUBULAR ARTICLE
Robert C. Pratt, Scituate, and Charles H. Scott, Braintree, Mass., assignors to Babbitt Pipe Company, Inc., West Hanover, Mass.
Filed Oct. 16, 1959, Ser. No. 846,879
14 Claims. (Cl. 156—194)

The present invention relates to plastic tubular members and the method of manufacturing such members.

The invention contemplates the manufacture of such members by winding a preform which is smaller in circumference than the final tubular member and of greater wall thickness, then reducing the wall thickness and increasing the circumference by internally applied pressure.

The tubular members are composite structures of reinforcing material and resin. Various types of material are used, generally being fibrous sheet material such as paper or asbestos which have an inherent but limited stretch characteristic, glass webs which likewise have a limited stretch characteristic, glass filaments and glass fabrics which do not have a stretch characteristic, although when the fabric is tensioned the weave does open to a very limited extent.

The object of this invention is to manufacture tubular members using any of the foregoing as reinforcing material and also using them in combination with one another.

A further object is to manufacture them by processes which permits economical production.

A still further object is an apparatus for carrying out the processes and assures the manufacture of rigid, strong, structures in length of twenty or more feet and unlimited diameters.

These and other objects will become apparent from the description herein when read with the accompanying drawings wherein:

FIGURE 1 is a schematic view showing the steps employed in impregnating sheet material with resin, FIGURE 2 is a cross sectional view of the apparatus employed, and FIGURE 3 is a view of a mandrel sleeve used in conjunction with the apparatus shown in FIGURE 2.

The tubular structures herein are made by spirally wrapping strips of resin treated material into a preform, placing the preform onto an expandable mandrel, then compressing the preform radially outwardly and expanding it circumferentially to form the finished product.

To accomplish the foregoing it is apparent that the plies of the preform must be enlarged circumferentially and to do this the sheet material should be initially coated with resin. As shown in FIG. 1, the sheet 2 is drawn through a bath of phenolic resin 4, the resin being in the A stage, and thereafter through an oven 6 to dry off the solvents, whereupon the sheet is rewound. In so treating the sheet the heat in the oven 6 should be maintained at a temperature which not only dries off the solvents but advances the resin to a point where it will have a very low flow characteristic, in order to obtain rapid final curing. The flow characteristics should be approximately 10%, or in other words, the B stage is advanced to what might be termed a B-plus stage. Upon completing the treatment of the sheet it is then cut into strips for spiral winding into preforms in the customary way.

The reduction of the preform into a final tubular member is accomplished by the apparatus illustrated in FIG. 2 which will be initially described so that the forming steps may be readily followed. As therein shown a cylindrical metal die 10 is provided with a surrounding jacket 12 to allow the passing of fluid around the die. The jacket 12 is connected by an inlet passage 14 through a control valve 16 to a source of steam or through a control valve 18 to a source of water. Diametrically opposite the inlet passages the jacket is provided with an outlet passage 20 connected through a control valve 22 to an outlet leading to a condenser or to the water supply. The wall of the die is made sufficiently strong to withstand the internal pressures required, but it is preferably kept at a minimum wall thickness to assure rapid heat conductivity therethrough for reasons subsequently explained.

Located within the die is a complementary mandrel having a metal core 24 on which there is mounted an expansible sleeve 26, secured to each end of the core by cylindrical cup shaped sleeve members 28 screw threaded onto the end reduced portions 30 of the core and held by lock nuts 29. The mandrel is secured within the die by cylindrical cup shaped collar members 32 which are forced into holding position by lock nuts 34 also threadedly mounted on the reduced core portions 30. The mandrel is further provided with an inlet passage 36 which leads to a position beyond the adjacent secured end of the sleeve 26 wherein radial passages lead to a circumferential groove 38 in the core face. The opposite end of the core interior of the sleeve is provided with a similar circumferential groove 40 from which radial passages lead to an outlet passage 42. The circumferential grooves are interconnected by the longitudinally extending grooves 44 and additional circumferential grooves 40.

As the mandrels are designed for tubular members 20 or more feet in length they must be sufficiently rigid for ready handling. The provision of the grooves as described above lightens the mandrel but more important they serve to assure simultaneous expansion of the sleeve. If for example only one passage is provided then upon the application of fluid pressure the adjacent section of the sleeve will expand a substantial amount before the fluid moves along the sleeve and as the fluid flows an undulating wave is created and the air is trapped at the end of the sleeve. Some improvement is obtained when both inlet and outlet passages are provided as shown herein, but best results are accomplished by the provision of the hollowed-out or chamber portions of the mandrel. With this construction when fluid is introduced it will initially flow through the grooves, flooding the mandrel and forcing out all the air. Thereafter as the pressure is increased the sleeve will expand uniformly away from the core.

To accomplish flooding of the mandrel the inlet passage 36 of the core is connected to a hydraulic fluid passage 45 which connects through a control valve 46 to a hydraulic fluid passage 47 into which hydraulic fluid under pressure is forced by a pump 48. A bypass 50 is provided around the pump with a suitable release valve 51 to allow recirculation of the hydraulic fluid back to its source if the pressure rises above that for which the valve is set. The hydraulic fluid passage 47 intermediate the control valve 46 and pump 48 is surrounded by a suitable jacket 52 connected through a valve 60 to a source of steam for heating the hydraulic fluid. The temperature of the hydraulic fluid is controlled by the admission of steam through a valve 60 into the jacket 52, the valve 60 being electrically responsive to any suitable type of temperature control means 62 having a suitable temperature responsive element 63 located within the hydraulic fluid passage 47. The mandrel sleeve may also be heated by an electrical element 65 embedded therein.

As is apparent, when the control valve 46 is open the hydraulic fluid will enter the mandrel and pass therethrough and to control the pressure within the mandrel there is provided at the outlet end of passage 42 a bleeder valve 64. This valve also connects to a passage 66 which terminates in a two-way valve 70 for directing the hydraulic fluid or water to its proper sources.

In carrying out the process the preform is initially placed over the mandrel or the mandrel within the preform and this positioning is shown in FIG. 2 with the mandrel sleeve expanded. The sleeve normally fits close to the mandrel core and the preform substantially fills the space between the sleeve and the inner wall of the die 10. Thereafter the collar members 32 are inserted until they abut against the ends of the preform and are then locked in position.

With the preform so positioned the hydraulic fluid valve 46 is opened permitting fluid to flow into the mandrel. The fluid will initially flow into the circumferential groove 38 along the longitudinal grooves 44 into the circumferential groove 40 and then through the outlet passage 42. During this time the bleeder valve 64 is wide open and the circulation of the fluid through the mandrel will force out any air within the grooves.

The fluid being introduced into the mandrel has been brought to a temperature which will heat the sleeve and the preform sufficiently to cause the resin to soften but not cause it to appreciably advance.

The heating of the resin is sufficient to bring it to what may be called a "gunk stage." The sheet fibrous material will become softened by and the resin will act as a lubricant for slipping of the fibres. After the "gunk" stage is reached the pressure in the mandrel is increased to expand sleeve 26 to bring the plies into intimate contact with one another while simultaneously expanding them circumferentially. This increase in pressure is continued until the wall thickness of the preform has been reduced to approximately the desired wall thickness of the finished tubular member.

Simultaneously with the application of pressure the temperature of both the mandrel and the die is raised to curing temperature. This is accomplished by raising the temperature of the hydraulic fluid and simultaneously passing steam through the die jacket. The heat is maintained until the resin is cured. Because the resin has a low flow characteristic rapid curing is accomplished.

Following the curing it is essential for rapid manufacture that the finished tubular member be rapidly cooled. To accomplish this cold water is fed to the die jacket 12, the steam valve 16 meanwhile having been closed and heat cut off from the hydraulic fluid. If desired, cooling water may also be fed to the mandrel through bypass 72 and valves 74 and 76, but pressure is maintained to prevent the water droplets flashing into steam.

The interior of the tubular member should have a high degree of finish and it would be preferred to do this with a sleeve 26 of expansible metal. This presents structural difficulties and the same result can be accomplished by covering the sleeve 26 with a metallic sleeve 90 which, when the sleeve is in its normal position around the mandrel core, fits snugly thereon. The sleeve 90 is provided with minute corrugations to permit expansion when the sleeve 26 expands. To assure the sleeve being released from the final tubular member its surface may be covered with a suitable parting agent prior to insertion over the mandrel sleeve 26.

When fibrous material such as paper or sheet asbestos is used the preforms are placed on the mandrel and the latter positioned within the die which has the same inside diameter as the desired outside diameter of the finished pipe. The preform will be of lesser outside diameter than that of the die and its inside diameter will run as much as 40% less than that desired in the finished tubular member. The wall thickness of the preform is generally from 25 to 40% greater than that desired in the finished tubular member.

As fibrous sheet material has only an inherent stretch the mandrel sleeve is brought into contact with the plies and heated. This softens the resin but does not appreciably advance it. The temperature within the die to do this is approximately 180° F. This preheating has been referred to above as the "gunk" stage and because of the softening of the resin the fibres within the sheet are lubricated and will readily slip. The slippage or stretching should be limited to one half a fibre length.

Following the softening stage, pressure is then applied to the mandrel to reduce the preform to the wall thickness and strength required in the final product. For example with 8" diameter ventilating ducts, a final pressure of 300 pounds is used.

When great strength is desired, as for example with water pipe subject to 150 p.s.i. when in use, the plies and resin should be amalgamated into a solid mass and pressures of 900 to 1500 pounds are used. This pressure will compress the plies in their wet stage to approximate final wall thickness, and also prevent flashing into steam of the water droplets in the material, thus eliminating voids. When the pressure has reached its desired maximum the die is rapidly heated by passing steam around it to bring it to the curing temperature. The mandrel temperature may also be brought to the curing temperature, this being approximately 320° F. With heat applied both internally and externally, rapid heat transfer results. Under this rapid heat transfer the resin which has a low flow characteristic will rapidly advance to the curing stage.

Following the curing the die is rapidly cooled by flowing cold water around it. Cold water may also be circulated through the mandrel but pressure should be maintained to prevent flashing of the water droplets.

With the tubular members made as above described the manufacture is very rapid. The softening of the resin is generally accomplished in approximately 15 seconds per ply and the curing in one minute per ply plus five minutes. Cooling is a matter of minutes depending upon the temperature of the cooling fluid.

When woven glass fabrics are used the process must be varied to allow slippage of the glass fabric plies. After resin has been softened as when using fibrous sheet material the pressure on the mandrel sleeve is increased until the pressure is slightly less than the tensile strength of one ply of the woven glass fabric. This pressure is determined by doubling the tensile strength of the woven glass fabric as established by the manufacturer and dividing this figure by the desired diameter of the finished tubular member. It has been found that a pressure approximately 20% lower than the calculated pressure gives the best results. For example, if the manufacturer establishes a tensile strength for the woven glass fabric at 200 p.s.i., this figure is doubled, thus arriving at 400 p.s.i., which figure is divided by the diameter of the tubular member being manufactured. Assuming the tubular member to have a four inch diameter, then the pressure to be used within the mandrel will be 100 p.s.i. less 20%, resulting in a figure of 80 p.s.i. as the pressure to be applied.

With the resin softened and the pressure increased to the calculated figure, the woven glass fabric will be enlarged, however the edges of the spiral will remain in abutting relationship. The preform is held under this condition approximately five minutes per ply of woven glass. In this manner the diameter of the glass woven material strip will unwind to approximately the diameter of the finished tubular member and simultaneously if the fibrous strips are used in conjunction therewith they will have been stretched circumferentially to approximately the proper diameters.

Thereafter the final forming, curing and cooling steps are carried out.

When fibrous sheet having a controlled stretch is used the preheating stage may be eliminated as described in the co-pending application of Robert C. Pratt, Serial No. 846,878, filed October 16, 1959, now Patent No. 3,125,478.

It is apparent that various modifications may be made. If very thick walled members are being fabricated heat may be applied externally as well as internally during the preheating stage. Likewise preheating of the hydraulic fluid may be eliminated and the expandable sleeve heated by the electrical element or both may be used.

The invention having been described, the following is claimed:

1. The method of making a multi-ply plastic tubular member comprising the steps of,
   impregnating strips of fibrous material having an inherent stretch characteristic with a thermo-setting resin,
   spirally winding a plurality of the strips into a multi-ply tubular preform,
   heating the preform to a temperature below the curing temperature of the resin to soften the resin and lubricate the fibrous material,
   following the softening of the resin applying an outwardly acting pressure internally of the preform to compress the plies together while circumferentially stretching the fibrous material,
   and simultaneously raising the temperature of the heat to the curing temperature of the resin.
2. The method set forth in claim 1 wherein the heating is discontinued when the resin is cured and the tubular member is cooled.
3. The method of making a multi-ply plastic tubular member comprising the steps of,
   impregnating strips of fibrous material having an inherent stretch characteristic with a thermo-setting resin,
   spirally winding a plurality of the strips into a multi-ply tubular preform,
   inserting a tubular expansible member within the preform,
   placing a rigid tubular restraining member around the preform,
   heating the tubular expansible member within the preform to a temperature which will soften the resin of the preform and lubricate the fibrous material of the preform,
   following the softening of the resin applying an outwardly acting pressure internally of the expansible member to force the plies outwardly against each other and the restraining member by compressing the plies together while circumferentially stretching the fibrous material,
   and simultaneously increasing the temperature of the expansible member to a temperature which will cure the resin.
4. The method set forth in claim 3 including heating the restraining member simultaneously with the heating of the expansible member.
5. The method set forth in claim 3 wherein the tubular expansible member and the restraining member are heated by a circulating fluid.
6. The method set forth in claim 3 wherein following the curing of the resin, the heating of the expansible member is discontinued and the restraining member is cooled by a circulating fluid to dissipate the heat in the preform while maintaining the outwardly acting internal pressure.
7. The method of making a multi-ply plastic tubular member comprising the steps of,
   impregnating strips of fibrous material having an inherent stretch characteristic with a thermo-setting resin,
   spirally winding a plurality of the strips into a multi-ply tubular preform,
   heating the preform to a temperature to soften the resin and lubricate the fibrous material by circulating a heated fluid therearound,
   following the softening of the resin applying an outwardly acting pressure internally of the preform to compress the plies together while circumferentially stretching the fibrous material,
   and simultaneously raising the temperature of the heated fluid to cure the resin.
8. The method set forth in claim 7 wherein following the curing of the resin the circulation of the heated fluid is discontinued and a cooling fluid is circulated around the tubular member to rapidly dissipate the heat therefrom.
9. The process of making plastic tubular members which comprises,
   spirally winding a plurality of strips of resin treated woven glass fabric material into a multi-ply tubular preform,
   applying fluid heat internally of the preform at a temperature below the curing temperature of the resin to soften the resin,
   applying an outwardly acting pressure internally of the preform to enlarge the diameter of the preform to substantially the diameter of the finished tubular member,
   the pressure being in p.s.i. calculated by taking 80% of the tensile strength of the glass woven fabric multiplied by two and divided by the diameter of the finished member, holding said pressure for approximately five minutes per ply, and
   thereafter increasing the outwardly acting pressure to compress the plies together while increasing the temperature of the fluid heat to the curing temperature of the resin.
10. The method of making a multi-ply plastic tubular member comprising the steps of impregnating strips of fibrous material with a thermo-setting resin, spirally winding a plurality of the strips into a tubular preform, heating the preform to a temperature below the curing temperature of the resin to soften the resin and lubricate the individual fibres to allow slippage of the fibres, internally and outwardly compressing the preform to cause the fibres to slip over each other into the desired shape and simultaneously raising the temperature of the resin to curing temperature.
11. The method of claim 10 including the further step of rapidly cooling the formed tube while maintaining the compression.
12. The method of claim 10 wherein the fibrous material is paper.
13. The method of claim 10 wherein the fibrous material is asbestos.
14. The method of claim 10 wherein the fibrous material is woven glass fabric.

References Cited in the file of this patent

UNITED STATES PATENTS

| | | |
|---|---|---|
| 1,130,030 | Sill | Mar. 2, 1915 |
| 1,475,623 | Egerton | Nov. 27, 1923 |
| 2,320,564 | Brooks | June 1, 1943 |
| 2,390,171 | Ratay | Dec. 4, 1945 |
| 2,411,542 | Ilch | Nov. 26, 1946 |
| 2,552,599 | Stout | May 15, 1951 |
| 2,594,838 | Alexander et al. | Apr. 29, 1952 |
| 2,614,058 | Francis | Oct. 14, 1952 |
| 2,723,426 | Pelley | Nov. 15, 1955 |
| 2,737,998 | Meanor et al. | Mar. 13, 1956 |
| 2,739,350 | Lampman | Mar. 27, 1956 |
| 2,768,920 | Stout | Oct. 30, 1956 |
| 2,783,174 | Stephens | Feb. 26, 1957 |
| 2,794,481 | Anderson | June 4, 1957 |
| 2,845,658 | Knibb | Aug. 5, 1958 |
| 2,848,015 | Roberts et al. | Aug. 19, 1958 |
| 2,892,749 | Carpenter | June 30, 1959 |
| 2,977,269 | Nerwick | Mar. 28, 1961 |
| 2,984,870 | Warnken | May 23, 1961 |
| 3,033,730 | Martin | May 8, 1962 |